(12) United States Patent
Andrews, Jr.

(10) Patent No.: US 7,944,093 B2
(45) Date of Patent: May 17, 2011

(54) OFF-PEAK POWER DISTRIBUTION SYSTEM

(76) Inventor: Robert C. Andrews, Jr., Bel Air, MD (US)

( * ) Notice: Subject to any disclaimer, the term of this patent is extended or adjusted under 35 U.S.C. 154(b) by 312 days.

(21) Appl. No.: 12/412,697

(22) Filed: Mar. 27, 2009

(65) Prior Publication Data
US 2010/0244588 A1    Sep. 30, 2010

(51) Int. Cl.
*H01H 43/00* (2006.01)
(52) U.S. Cl. .......................... 307/141; 700/295
(58) Field of Classification Search .......... 307/140, 307/141, 38, 41, 116; 315/360; 700/286, 700/288, 291, 292, 295, 296
See application file for complete search history.

(56) References Cited

U.S. PATENT DOCUMENTS

| | | | | |
|---|---|---|---|---|
| 4,315,163 A | * | 2/1982 | Bienville | 307/66 |
| 4,804,938 A | * | 2/1989 | Rouse et al. | 370/276 |
| 4,894,764 A | * | 1/1990 | Meyer et al. | 363/65 |
| 5,956,462 A | * | 9/1999 | Langford | 392/449 |
| 6,680,547 B1 | * | 1/2004 | Dailey | 307/31 |
| 6,891,478 B2 | * | 5/2005 | Gardner | 340/635 |
| 6,922,342 B2 | * | 7/2005 | Doblar et al. | 361/736 |
| 7,051,235 B2 | * | 5/2006 | Wu | 714/20 |

* cited by examiner

*Primary Examiner* — Albert W Paladini
(74) *Attorney, Agent, or Firm* — Italia IP; James A. Italia

(57) ABSTRACT

A system according to the present invention including a main utility distribution panel which through corresponding circuit breakers, directly powers facility power line circuits which remain powered continuously, and an 'off-peak' utility distribution panel being powered by the main utility distribution panel through a contactor (relay, switch, etc.) controlled by a 24 hour timer, and the 'off-peak' utility distribution panel in turn powers facility power line circuits which may be de-energized to provide zero power draw from the main utility distribution panel during a selected time period as provided by the timer, which generally corresponds to periods when the facility is unoccupied and/or the equipment and appliances are turned off.

7 Claims, 1 Drawing Sheet

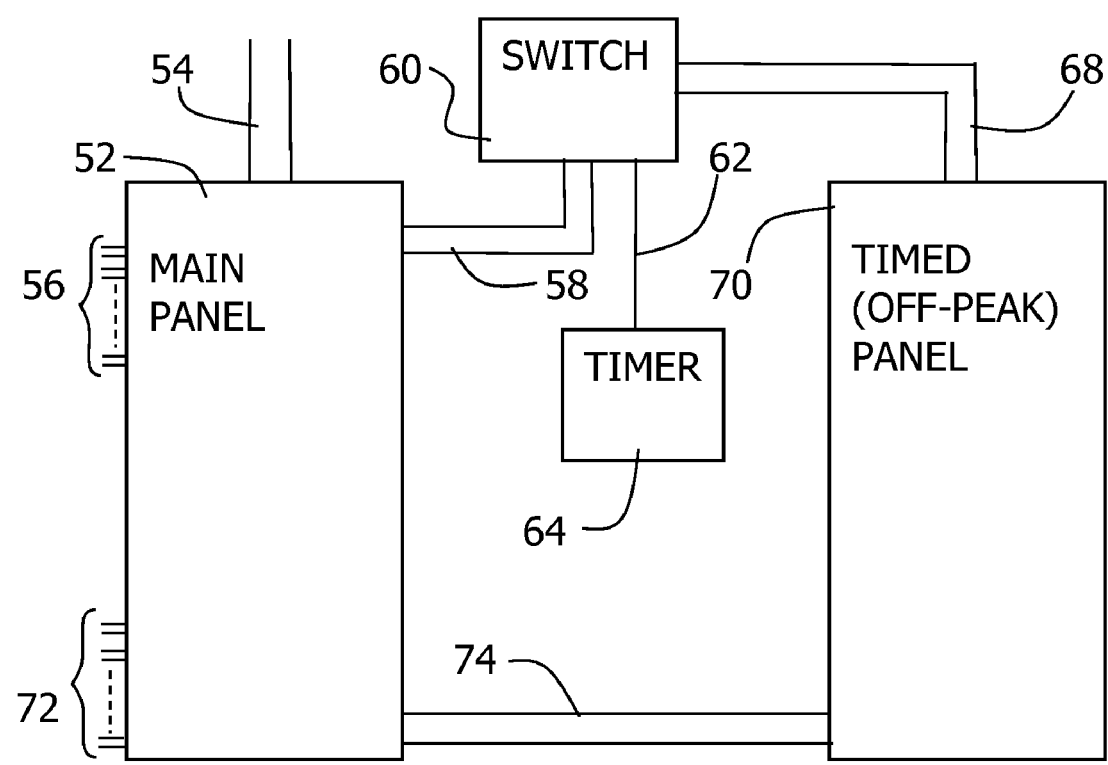
Figure

OFF-PEAK POWER DISTRIBUTION SYSTEM

FIELD OF THE INVENTION

The present invention relates to power distribution systems, in particular to power distribution systems having timer controlled power distribution panels.

BACKGROUND

Presently, many electrical appliances continue to draw a relatively small amount of power when turned off, by comparison to the power consumed when on. However, when aggregated, the power draw by electrical equipment when off becomes significant in terms of customer expense and inefficient use of public utilities. For one typical consumer having a 200 amp service panel, the total amount of current drain when all devices were turned off exceeded 25 amps, contributing to a significant non-use power consumption and associated costs.

SUMMARY

The system according to the present invention includes a main utility distribution panel which through corresponding circuit breakers, directly powers facility power line circuits which remain powered continuously, and an 'off-peak' utility distribution panel being powered by the main utility distribution panel through a contactor (relay, switch, etc.) controlled by a 24 hour timer, and the 'off-peak' utility distribution panel in turn powers facility power line circuits which may be de-energized to provide zero power draw from the main utility distribution panel during a selected time period as provided by the timer, which generally corresponds to periods when the facility is unoccupied and/or the equipment and appliances are turned off.

BRIEF DESCRIPTION OF THE DRAWINGS

The drawing, when considered in connection with the following description, is presented for the purpose of facilitating an understanding of the subject matter sought to be protected.

The FIGURE is a block diagram of an exemplary embodiment of the present invention.

DETAILED DESCRIPTION

As seen in the FIGURE, the exemplary embodiment 50 includes a main power distribution panel 52 which is connected to receive a main power feed 54 from a pole, street feed, or other source of power. In the example shown, the main power feed is a 240/120 volt feed and the main power distribution panel is a 200 ampere capacity panel, and different power feeds and main power distribution panel capacities are within the scope of the present invention. The main power distribution panel typically includes several branch circuits 56 to which loads are connected which are continuously maintained, i.e. kept on during peak energy consumption hours.

An electrically controllable switch 60 is connected to a power source such as a branch circuit from the main power distribution panel 52, or directly from the main power feed 54 via 58 and the main power distribution panel 52. The switch 60 typically comprises a lighting contactor, a relay or any other electrically controllable switch which selectively interrupts the flow of power from the source or branch circuit to which it is connected in response to an electrical signal on control line 62 from a timer 64. The timer 64 provides the control signal to the switch 60 for selective time durations and intervals, and typically are selected to correspond to times of equipment is not used, and equipment which is nominally turned off. Also, the times that the switch 60 is turned off may correspond to selected times of peak electrical energy consumption. Alternately, the switch 60 may interrupt the flow of power from the source or branch circuit to which it is connected in the absence of an electrical control signal, and the timer 64 correspondingly selectively provide a signal and an absence of the control signal of selective time duration(s) and interval(s). The timer 64 may also comprise a programmable timer, and comprises a 7-day, 24-hour time in the exemplary embodiment 50 and may have different or the same times and durations in the different days.

An 'off-peak' power distribution panel 70 is connected to receive power from the main distribution panel branch circuit (or source) via switch 60 and connection 68. When the switch 60 is closed or open according to the control signal received from the timer 64, a flow of power is correspondingly provided or interrupted to the off-peak power distribution panel 70, which in turn powers or does not power its several branch circuits 72 which are connected to equipment (not shown) to be completely turned off, that is, no power flows through the corresponding 'off-peak' branch circuit 72. The 'off-peak' branch circuits may be routed directly to the 'off-peak' panel 70 or via the connection 74 and the main power distribution panel 52.

Modification and substitutions made by one of ordinary skill in the art are within the scope of the present invention, which is not limited except by the claims which follow.

What is claimed is:

1. An off-peak power conservation system, comprising:
    a main power distribution panel receiving a power from a source and providing a first plurality of circuits to external devices;
    a switch connected to a power source and selectively providing power to an output according to a control signal;
    a timer providing said control signal; and
    an off-peak power distribution panel receiving power from said switch output and providing a second plurality of circuits to external devices.

2. The off-peak power conservation system of claim 1, wherein said switch power source is one of said first plurality of circuits.

3. The off-peak power conservation system of claim 1, wherein said switch power source comprises said power source to which said main distribution panel is connected.

4. The off-peak power conservation system of claim 1, wherein said switch comprises one of a contactor, a relay and an electrically controlled switch.

5. The off-peak power conservation system of claim 1, wherein said timer comprises a 24 hour timer providing said control signal according to a selected time interval.

6. The off-peak conservation system of claim 1, wherein said timer comprises a programmable timer.

7. The off-peak conservation system of claim 1, wherein said second plurality of circuits are provided via said main distribution panel to corresponding load circuits.

* * * * *